(12) United States Patent
Chen

(10) Patent No.: US 9,193,024 B2
(45) Date of Patent: Nov. 24, 2015

(54) SURFACE PROCESSING SYSTEM FOR A WORK PIECE

(71) Applicant: Qiyue Chen, Taizhou (CN)

(72) Inventor: Qiyue Chen, Taizhou (CN)

(73) Assignee: Taizhou Federal Robot Technology Co., Ltd, Taizhou (CN)

( * ) Notice: Subject to any disclaimer, the term of this patent is extended or adjusted under 35 U.S.C. 154(b) by 0 days.

(21) Appl. No.: 14/341,785

(22) Filed: Jul. 26, 2014

(65) Prior Publication Data

US 2015/0044944 A1    Feb. 12, 2015

(30) Foreign Application Priority Data

Aug. 10, 2013   (CN) .......................... 2013 1 0346669
Dec. 6, 2013    (CN) .......................... 2013 1 0653014

(51) Int. Cl.

| B24B 27/00 | (2006.01) |
|---|---|
| B24B 21/00 | (2006.01) |
| B24B 21/12 | (2006.01) |
| B24B 21/20 | (2006.01) |
| B24B 41/00 | (2006.01) |
| B24B 41/06 | (2012.01) |
| B24B 55/04 | (2006.01) |
| B25J 11/00 | (2006.01) |
| B23Q 7/04 | (2006.01) |
| B23Q 39/02 | (2006.01) |

(52) U.S. Cl.
CPC ........... *B24B 27/0076* (2013.01); *B24B 21/006* (2013.01); *B24B 21/008* (2013.01); *B24B 21/12* (2013.01); *B24B 21/20* (2013.01); *B24B 27/0023* (2013.01); *B24B 27/0069* (2013.01); *B24B 41/005* (2013.01); *B24B 41/06* (2013.01); *B24B 55/04* (2013.01); *B25J 11/0065* (2013.01); *B23Q 7/047* (2013.01); *B23Q 39/027* (2013.01)

(58) Field of Classification Search
CPC ............ B24B 27/0076; B24B 27/0069; B24B 21/006; B24B 27/0023; B24B 7/16
See application file for complete search history.

(56) References Cited

U.S. PATENT DOCUMENTS

| 4,653,231 | A | * | 3/1987 | Cronkhite et al. .............. 451/67 |
|---|---|---|---|---|
| 5,361,545 | A | * | 11/1994 | Nakamura ..................... 451/287 |
| 5,908,347 | A | * | 6/1999 | Nakajima et al. ................. 451/5 |
| 6,991,524 | B1 | * | 1/2006 | Cooper et al. .................. 451/58 |

(Continued)

FOREIGN PATENT DOCUMENTS

| CN | 201189633 | 2/2009 |
|---|---|---|
| CN | 102441835 A | 5/2012 |
| CN | 202726687 U | 2/2013 |

*Primary Examiner* — Dung Van Nguyen
(74) *Attorney, Agent, or Firm* — Minder Law Group; Willy H. Wong

(57) ABSTRACT

The present invention provides a surface processing system for a work piece in the mechanical technical field. The system comprises at least one group of polishing units. A manipulator and several polishers with different polishing precisions are provided on the polishing units. The polishers are arranged around the manipulator in turn. The work piece could be moved by the manipulator between the processing center and the polishing units. The machined work piece is loaded by the manipulator for one time when the manipulator is located at the processing center. When the manipulator is located at the polishing units, the manipulator keeps holding the work piece and transfers the work piece in a preset sequence to each polisher corresponding to the polishing unit where the manipulator is located. The surface of work pieces having different wall thicknesses and complex surfaces could be processed in a large batch with a high efficiency.

17 Claims, 15 Drawing Sheets

(56) References Cited

U.S. PATENT DOCUMENTS

| | | | |
|---|---|---|---|
| 7,037,174 B2 * | 5/2006 | Chen et al. ................ 451/5 |
| 7,273,408 B2 * | 9/2007 | Chen et al. ................ 451/11 |
| 2010/0099340 A1 * | 4/2010 | Chen ................ 451/287 |
| 2014/0242885 A1 * | 8/2014 | Nakao et al. ................ 451/57 |

\* cited by examiner

SURFACE PROCESSING SYSTEM FOR A WORK PIECE

BACKGROUND OF THE INVENTION

1. Field of Invention

The present invention relates to a surface processing system in the polishing technical field, and in particular, to the surface processing treatment for a work piece, including a valve, a water pipe and, a water faucet.

2. Related Art

In the manufacturing industry, in order to protect the quality and aesthetic appearance of the products, polishing and finishing of the work piece are important processes for molding of components. Some problems may exist in the casting shape and machining size for components of complex appearance, particularly water faucets for bathrooms, including deviation, variation on wall thickness and inconsistency in shapes and positions, for which the components could not be processed by special machine tools. Therefore, man power will required for processing on abrasive belt machine and cloth wheel machine. As heat will be generated by finishing and friction and a large amount of metallic dust will be produced in the process of finishing, such working conditions are harmful to humans. Moreover, thanks to instability of manual operation, the finishing depth can not be easily and precisely determined. Consequently, low operation efficiency is resulted and the uniformity and stability of polishing products could not be sufficiently guaranteed.

Moreover, the ordinary finishing and polishing mechanisms are too simple to achieve grinding on various complex curved surfaces from multiple axial directions, orientations and angles. Therefore, the existing finishing and polishing mechanisms could be used for efficient and precise processing and mostly have to depend on rough grinding by technicians, for which the polishing effect for various work pieces could not be guaranteed. Moreover, in the filed of polishers, the work piece generally could not be positioned precisely as a result of defects of the structure of equipment, and the work piece usually has to be grasped by hands when the work piece is being finished. The work piece is swung by both hands to different angles and different parts of the work price could be polished by the polisher, for which the work piece could not be conveniently finished or in a time and cost effective manner.

SUMMARY OF THE INVENTION

It is an object of the invention to address the problems existing in the prior art. The present invention provides a surface processing system and surface polishing method for a work piece. The surface of the work pieces having different wall thicknesses and complex surfaces could be processed in a large batch with a high efficiency and a high precision by using this system, for which the work pieces could be processed without man power to a large extent.

The object of the invention could be achieved by the following technical solution. A surface processing system for a work piece is disposed on the side of the processing center which could be used to machine the work piece. The system comprises at least one group of polishing units. A manipulator and several polishers with different polishing precisions are provided on the polishing units. The polishers are arranged around the manipulator in turn. The work piece could be moved by the manipulator between the processing center and the polishing units. The machined work piece is loaded by the manipulator for one time when the manipulator is located at the processing center. When the manipulator is located at the polishing units, the manipulator keeps holding the work piece and transfers the work piece in a preset sequence to each polisher corresponding to the polishing unit where the manipulator is located.

The operator could edit a complete set of control programs to control the surface processing system for the work piece. When the work piece has been machined at the processing center, the work piece will be held by the manipulator according to the control instruction and transferred to the polisher within the same polishing unit as the manipulator for polishing. As the system comprises at least one group of polishing unites, the work piece is held by the manipulator in each polishing unit in a sequence as well. For example, only if the work piece is held by one manipulator, the work piece in the processing center can be held by another manipulator. As several polishers are provided within one polishing unit, the surface of the work piece could be subject to all the polishing procedures within one polishing unit by polishing the work piece in turn on the polishers, while the work piece is loaded by the manipulator for one time. After the polishing process is finished, the work piece is placed in the finishing means again for finishing. As such, the surface of the work piece could be completely processed.

As the position of the work piece is kept steady when it is processed at the processing center, the manipulator is precisely controlled by numeric control programming when the work piece is actually processed. Consequently, the manipulator could hold each work piece in a very accurate and stable manner, and the action on each polisher within the polishing unit is the same as each other. As such, each work piece could be processed with a high precision and efficiency.

According to a preferred embodiment of the surface processing system for the work piece of the invention, the polisher is an abrasive belt polisher, comprising a housing and a driving wheel, a driven wheel and an abrasive belt located within the housing. The driving wheel is driven by a polishing motor into rotation. The housing is covered outside of the driving wheel and driven wheel and a portion of the driving wheel and a portion of the driven wheel extend out of the housing. The abrasive belt is covered on the driving wheel and driven wheel and the outer side of the abrasive belt exposed out of the housing is a polishing surface used for polishing the work piece.

Furthermore, the sizes of the abrasive particles of the abrasive belt of the adjacent polishers within the same polishing unit are gradually decreased.

Polishing wheels and a transform mechanism are further used in the polishers to improve the polishing precision of the surface of the work piece. Particularly, in the surface processing system for the work piece, a group of polishing wheels is provided within the housing. Each of the polishing wheels has a diameter different from that of the remaining polishing wheels. A transform mechanism is provided adjacent to the polishing wheels within the housing which could respectively drive the polishing wheels to press against the same position on the inner side of the polishing surface of the abrasive belt. When one polishing wheel is pressed against the inner side of the polishing surface, the other polishing wheels are separate from the polishing surface. According to a first embodiment of the transform mechanism of the polishers, in the surface processing system for the work piece, the transform mechanism includes a transform motor and a connection support. The central part of the connection support is fixedly connected with the output shaft of the transform motor. Several self-rotable polishing wheels with different curvatures are placed around the connection support. Each polishing wheel is distributed on the same circle centered on the output shaft of the transform motor. The connection support could be turned to at least press one of the polishing wheels against the inner side of the polishing surface and position the same.

In the surface processing system for the work piece, the transform mechanism further includes a controller, a proximity switch connected with the controller and induction blocks in the number identical to that of the polishing wheels. The proximity switch is placed on the outer side of the transform motor and the induction blocks are fixedly connected with the polishing wheels respectively. When the induction blocks rotate with the polishing wheels to the inner side of the polishing surface at a position opposite to the proximity switch, the proximity switch will receive the signal from the induction blocks and send the same to the controller, and the controller will control the transform motor to stop working and position according to the signal.

In the surface processing system for the work piece, the manipulator includes a base, a clamping frame and a clamping arm. The lower end of the clamping frame is fixedly connected in the axial direction and rotationally connected in the circumferential direction with the base. A first driving element is provided on the clamping frame for driving the clamping frame to rotate with respect to the base and to be positioned. The upper end of the clamping frame is hinged to the clamping arm. A chuck is set at the front end of the clamping arm to hold the work piece. A second driving element is provided between the rear end of the clamping arm and the clamping frame to drive the clamping arm to swing around the hinge point of the clamping frame with the clamping arm and to be positioned.

In the surface processing system for the work piece, the chuck includes a cylindrical connection cover and a columnar ejector pin provided within the connection cover. The ejector pin is circumferentially fixed and axially slidable relative to the connection cover. Several indentations are axially provided on the front end of the connection cover to form several elastic sheets at the front end of the connection cover. An annular shoulder is formed on the end of the elastic sheets to lock up the work piece. The inner end of the ejector pin is connected with the piston rod of the air cylinder mounted with the clamping arm. When the ejector pin extends forward, the front end of the connection cover will be extruded to open the elastic sheets at the front end of the connection cover outwards. Several positioning convex heads are formed on the frond end of the ejector pin for preventing the work piece from rotating relative to the ejector pin when the ejector pin is inserted into the inner hole of the work piece.

According to a first embodiment of the first driving element for the manipulator, in the surface processing system for the work piece, the first driving element comprises a rotary motor fixedly connected to the clamping frame. A non-rotary fixed gear is fixed on the base. The clamping frame is connected with a first transmission gear and a third transmission gear which is coaxial with and above the first transmission gear. A second transmission gear is fixedly connected with the rotation shaft of the rotary motor and engaged with the third transmission gear. The first transmission gear is engaged with the aforesaid fixed gear.

According to a first embodiment of the second driving element for the manipulator, in the surface processing system for the work piece, the second driving element includes a swing motor fixedly connected to the middle of the clamping frame. One end of the first connection rod is hinged to the swing arm of the swing motor, and the other end of the first connection rod is hinged to one end of the second connection rod. The other end of the connection rod is hinged to the rear end of the clamping arm.

According to a second embodiment of the first driving element for the manipulator, in the surface processing system for the work piece, the first driving element comprises a rotary motor fixedly connected to the base. An annular gear is fixedly connected to the inner side of the clamping frame. Several intermediate gears are connected with the base. A first transmission gear is fixedly connected with the rotation shaft of the rotary motor. The intermediate gears are engaged with the first transmission gear and the annular gear in the meantime. According to a second embodiment of the second driving element for the manipulator, in the surface processing system for the work piece, the second driving element includes a swing motor fixedly connected to the middle of the clamping frame, a first connection rod and a second connection rod. A transmission disk is fixedly connected with the rotation shaft of the swing motor. One end of the first connection rod is hinged to the edge of the transmission disk and the other end of the connection rod is hinged to one end of the second connection rod. The other end of the second connection rod is hinged to the rear end of the clamping arm.

In the surface processing system for the work piece, the polishers are distributed in an arc shape centered on the clamping frame of the manipulator, and the distance from each polisher to the clamping frame is the same as each other.

According to a second embodiment of the transform mechanism of the polishers, in the surface processing system for the work piece, the transform mechanism comprises adjustment guides disposed within the housing and sliders which are disposed on and could move along the adjustment guides. The polishing wheels are connected with the sliders. The transform mechanism further includes a polishing wheel driving element within the housing. The polishing wheel driving element is connected with the sliders and the polishing wheels are driven by the polishing wheel driving element to press against the inner side of the abrasive belt.

In the surface processing system for the work piece, the system further includes a finishing means on the side of the polishing unit, and there is at least one finishing means which finishes the polished work piece.

In the surface processing system for the work piece, a conveyer belt which could move horizontally is provided between the polishing unit and the finishing means.

In the surface processing system for the work piece, the finishing means includes a finishing frame, a clamp and a finishing wheel. A finishing guide is disposed horizontally on the finishing frame. The clamp is located on the finishing guide and the clamp is connected with the finishing driving element which could drive it to move. The finishing wheel is connected with the rotation shaft of the finishing motor and is located above the finishing guide.

The operator puts the work piece the surface of which is polished onto the clamp in the finisher. The clamp is driven by the finishing driving element to move along the finishing guide to the finishing wheel, and the finishing wheel is driven by rotation of the rotation shaft of the finishing motor to finish the surface of the work piece on the clamp. Of course, the finishing driving element could be an air cylinder or an oil cylinder, and the piston rod of the air cylinder or oil cylinder is connected with the clamp.

In the surface processing system for the work piece, there are two finishing guides which are horizontally disposed. A clamp is provided on each of the finishing guides. There are two finishing wheels respectively corresponding to these two finishing guides. The said two finishing wheels are connected with the same finishing motor. Two clamps and two finishing wheels are provided within the finishing frame to finish the surface of two work pieces in the meantime, for which the production efficiency of the work pieces is higher. Compared with the prior art, the surface processing system for the work piece has the following advantages.

First, in the surface processing system for the work piece, the manipulator in each polishing unit is used to hold the work piece in the processing center. As the position of the work piece at the processing center is kept steady, each corresponding work piece could be accurately held by the manipulator in the same manner. As a result, not only improved is the polishing precision of the work piece, but also the uniformity of each work piece is guaranteed.

Second, in the surface processing system for the work piece, several polishing units are evenly distributed around the processing center. It is ensured that the work piece subject to machining at the processing center could be polished in time by increasing the number of the polishing units. Consequently, the production efficiency of the work piece is improved and the work efficiency of the processing center is enhanced as well.

Third, in the surface processing system for the work piece, several polishers are disposed within one polishing unit, and the sizes of the abrasive particles on the polishers are gradually increased or decreased. The work piece is subject to all the polishing procedures in sequence in each polisher, the polishing precision of the surface of the work piece after being polished is higher. Meanwhile, the complex curved surfaces of the work piece are polished by pressing the polishing wheels against the inner side of the abrasive belt. As such, the system has a higher use value and a larger use scope.

Fourth, in the surface processing system for the work piece, the polishers are evenly and circumferentially distributed centered on the clamping frame of the manipulator in each polishing unit, which ensures the moving path of the work piece held by the manipulator from one polisher to the next polisher is the same as each other. To this end, the numeric control programming is largely simplified and each polishing step of the manipulator is kept the same, which is labor saving and improves the efficiency.

Fifth, in the surface processing system for the work piece, after the operate puts the work piece on the clamp, the work piece is automatically finished by the finishing means, which improves the degree of automation of the processing system, and saves time and labor.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The embodiments of the invention will be described below and the technical solutions of the invention will be further illustrated in connection with the accompanying figures. However, the present invention shall not be limited to these embodiments.

First Embodiment

Figure 10:
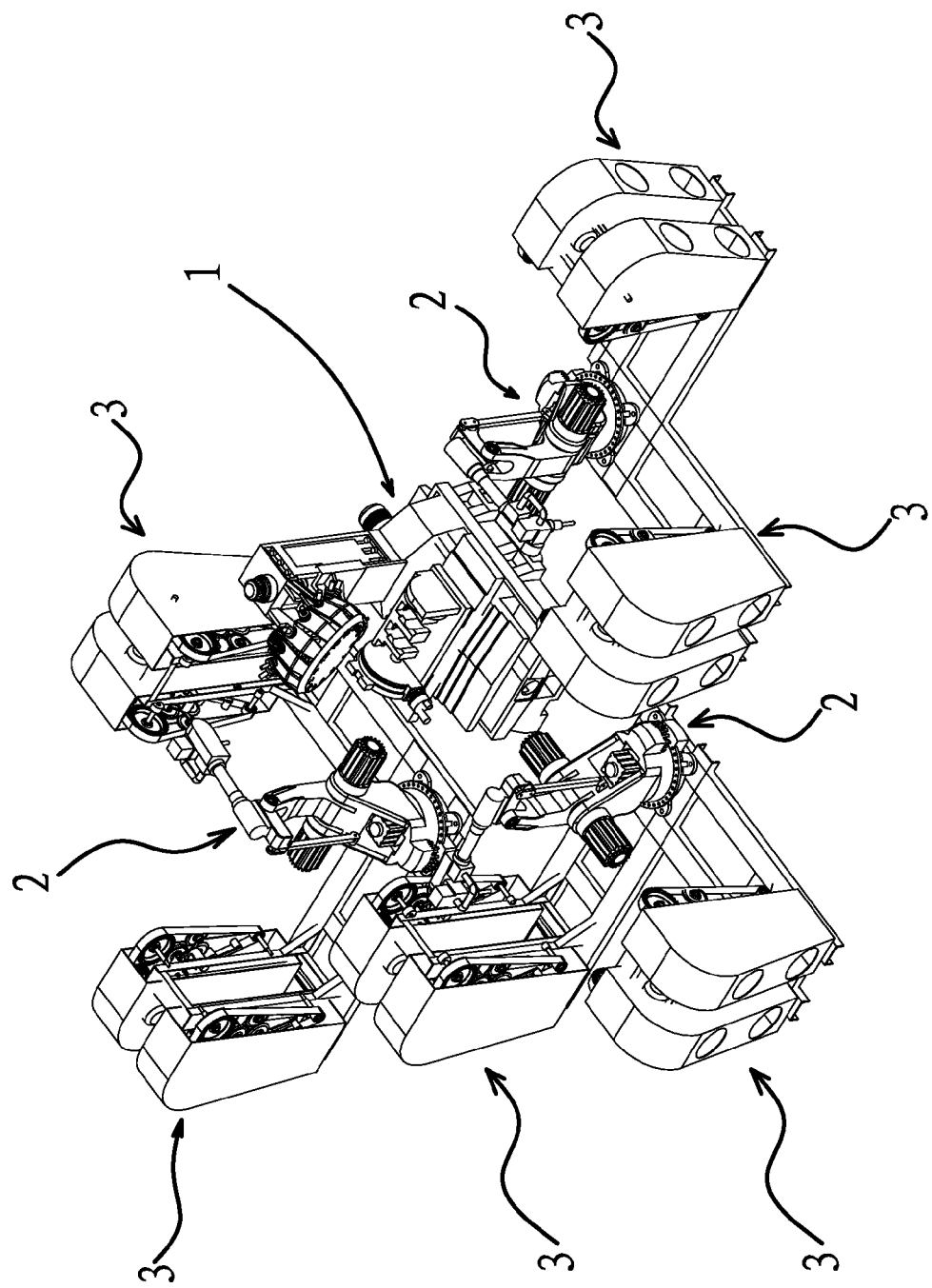
FIG. 10 is a structural diagram of the surface processing system for the work piece according to the first embodiment.

As shown in FIG. 10, a surface processing system for a work piece is disposed on the side of the processing center 1 for machining the work piece. The work piece to be processed could be a valve, a water faucet or a pipe. All the work pieces share a common feature that the work piece has an inner hole for being held by the manipulator. The system includes three groups of polishing unit A which are evenly distributed around the processing unit 1, and storage hoppers for containing processed work pieces are placed around each polishing unit A. A manipulator 2 and several polishers 3 having different polishing precisions are provided on the polishing unit A. In particular, four polishers 3 are arranged in sequence around the manipulator 2 and the manipulator 2 could move the work piece between the processing center 1 and the polishing unit A. When the manipulator 2 is located at the processing unit 1, the manipulator 2 loads all the machined work pieces at one time. When the manipulator 2 is located at the polishing unit A, the work pieces keep being held by the manipulator 2 and are transferred in preset sequence to each polisher 3 corresponding to the polishing unit A where the manipulator 2 is located, for being polished.

Figure 13:
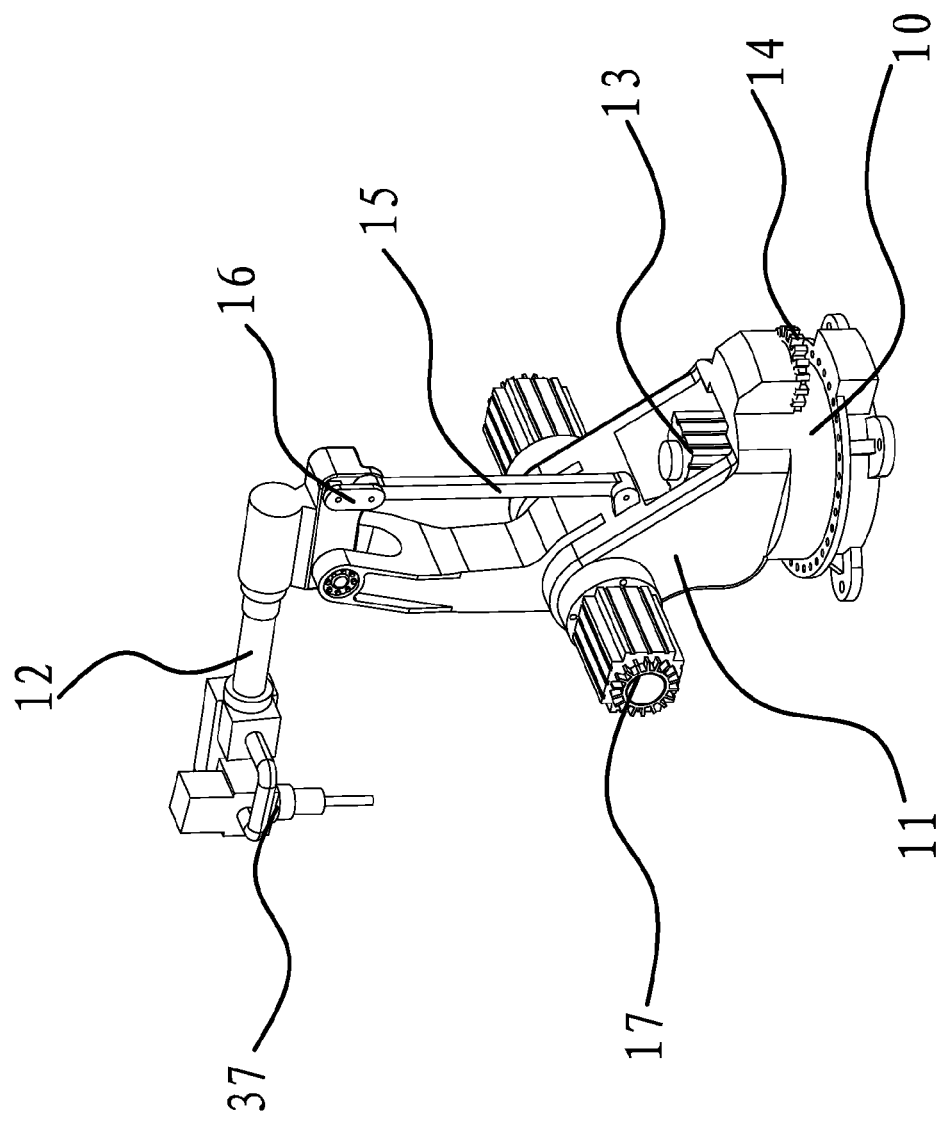
FIG. 13 is a structural diagram of the manipulator.

As shown in FIG. 13, the manipulator 2 includes a base 10, a clamping frame 11 and a clamping arm 12. The lower end of the clamping frame 11 is fixedly connected in the axial direction and rotationally connected in the circumferential direction with the base 10. A first driving element is provided on the clamping frame 11 for driving the clamping frame 11 to rotate with respect to the base 10 and to be positioned. The upper end of the clamping frame 11 is hinged to the clamping arm 12. A chuck is set at the front end of the clamping arm 12 to hold the work piece. A second driving element is provided between the rear end of the clamping arm 12 and the clamping frame 11 to drive the clamping arm 12 to swing around the hinge point of the clamping frame 11 with the clamping arm 12 and to be positioned. After the work price is processed at the processing center, the clamping frame 11 of the manipulator rotates to the processing center relative to the base 10 after being driven by the first driving element. The work piece within the processing center is held by the clamping arm 12 of the manipulator 2 and then turned into the polishing unit A corresponding to the said manipulator 2. After the work piece has been polished on one polisher 3 for the first time, the clamping frame 11 is turned by the first driving element into another polisher A relative to the base 10, for being polished for the second time, until the surface of the work piece is polished to the desired precision. The clamping arm 12 could rotate by means of the second driving element, so that the height of the clamping arm 12 could be adjusted to facilitate polishing.

Referring to FIG. 13, the first driving element comprises a rotary motor 13 fixedly connected to the clamping frame 11. A non-rotary fixed gear is fixed on the base 10. The clamping frame is connected with a first transmission gear 14 and a third transmission gear which is coaxial with and above the first transmission gear 14. A second transmission gear is fixedly connected with the rotation shaft of the rotary motor 13 and engaged with the third transmission gear. The first transmission gear 14 is engaged with the aforesaid fixed gear.

As shown in FIG. 13, the second driving element includes a swing motor 17 fixedly connected to the middle of the clamping frame 11, a first connection rod 15 and a second connection rod 16. One end of the first connection rod 15 is hinged to the swing arm 31 of the swing motor 17, and the other end thereof is hinged to one end of the second connection rod 16. The other end of the second connection rod 16 is hinged to the rear end of the clamping arm 12.

Figure 14:
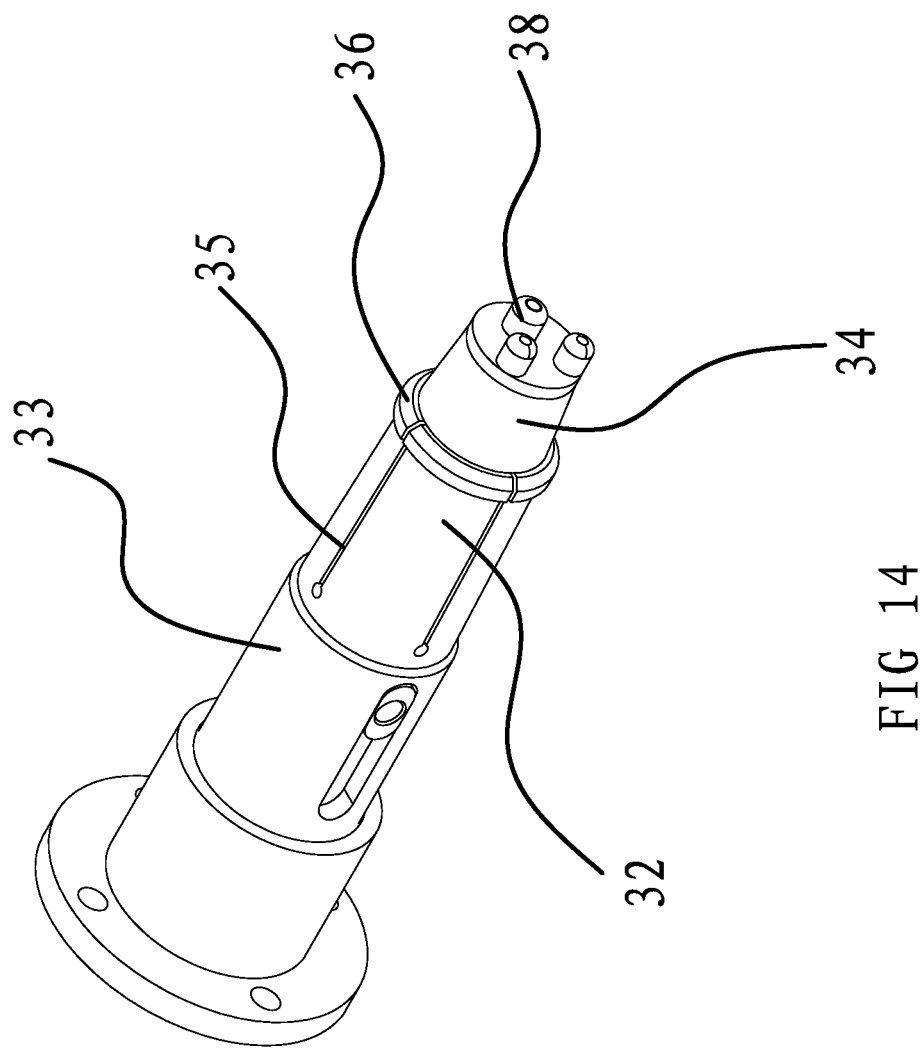
FIG. 14 is a structural diagram of the chuck of the manipulator.

In FIG. 14, the chuck includes a cylindrical connection cover 33 and a columnar ejector pin 34 provided within the connection cover 33. The ejector pin 34 is circumferentially fixed to the connection cover 33. The front end of the connection cover 33 and that of the ejector pin 34 are conical, in which the taper angle of the front end of the ejector pin 34 is larger than that of the front end of the connection cover 33, and the front end of the ejector pin 34 partially extends out of the front end of the connection cover 33.

Several indentations 35 are axially provided on the front end of the connection cover 33 to form three elastic sheets 32 at the front end of the connection cover 33. An annular shoulder 36 is formed on the outside circumferential surface of the front port of the connection cover 33, which could lock up the work piece. In other words, the annular shoulder 36 is positioned at the end of the elastic sheets 32. The inner end of the ejector pin 34 could be connected with the piston rod of the positioning air cylinder 37 mounted with the clamping arm 12. Three positioning convex heads 38 are formed on the frond end of the ejector pin 34. The front end of the ejector pin 34 will extend out of the front port of the connection cover 33 under the effect of the piston rod of the positioning air cylinder 37. Moreover, when the ejector pin 34 extends forward, the front end of the connection cover 33 will be extruded to open the front port, i.e., to open the elastic sheets 32 outwards. Therefore, the annular shoulder 36 with an increased diameter will be locked on the inner side wall of the work piece to hold the work piece firmly. Additionally, three positioning convex heads 38 at the front end of the ejector pin 34 are matched with the inner holes of the work piece to ensure the work piece will not rotate circumferentially relative to the chuck.

Figure 11:
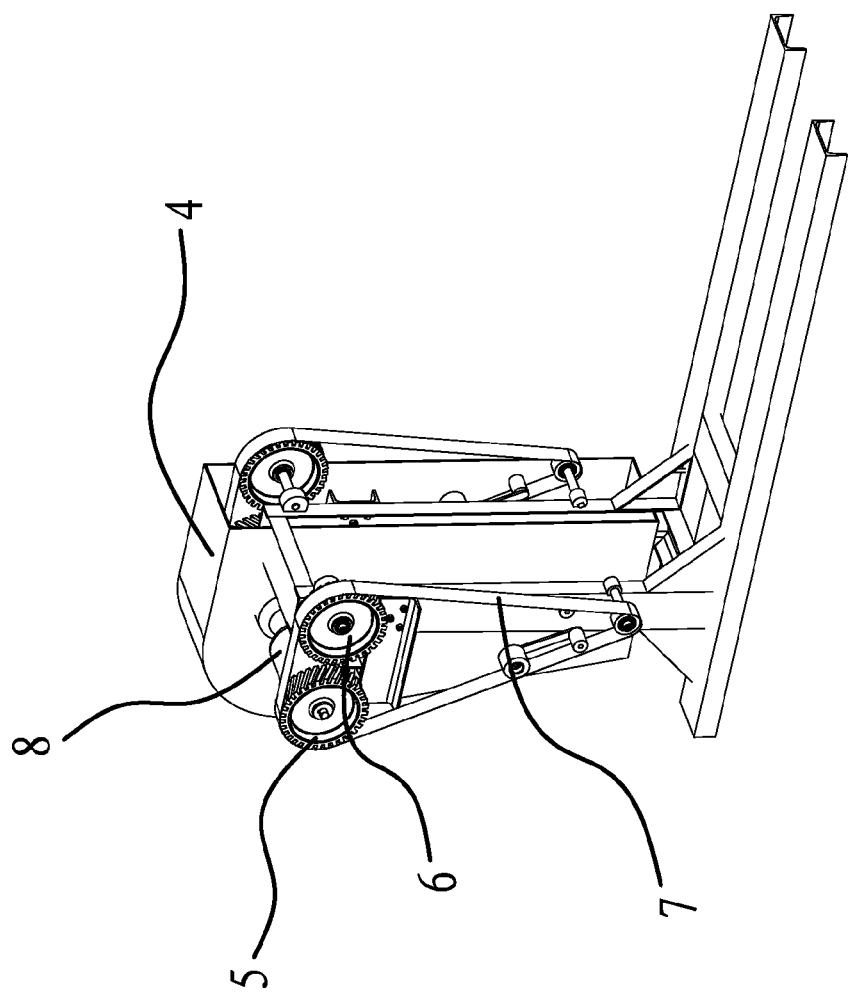
FIG. 11 is a structural diagram of the polisher of FIG. 10 omitting the polishing wheel and a part of the housing.
Figure 12:
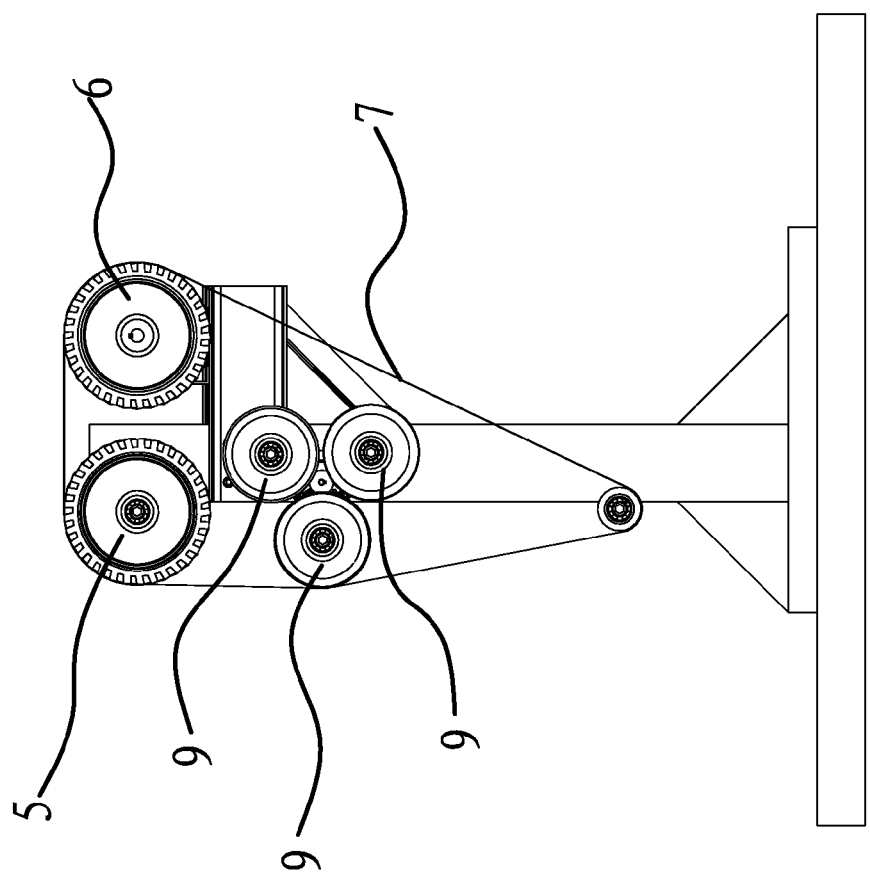
FIG. 12 is a side view of the polisher of FIG. 10 having polishing wheels.

As shown in FIGS. 11 and 12, the polisher 3 is an abrasive belt polisher, comprising a housing 4, and a driving wheel 5, a driven wheel 6 and an abrasive belt 7 within the housing 4. The driving wheel 5 is connected with a polishing motor 8. The housing 4 is covered outside of the driving wheel 5 and the driven wheel 6 and a portion of the driving wheel 5 and the driven wheel 6 extends out of the housing 4. The abrasive belt 7 is covered on the driving wheel 5 and driven wheel 6 and the outer side of the abrasive belt 7 exposed out of the housing 4 is a polishing surface used for polishing the work piece. The polishing motor 8 drives the driving wheel 5 into rotation, which further drives the abrasive belt 7 to rotate. The work piece is held by the manipulator 2 to contact the surface of the work piece with the polishing surface on the outer side of the abrasive belt 7 for polishing. Since the polishing surface is exposed out of the housing 4, work pieces of random shapes, including some elongated work pieces, could be processed as such.

A group of polishing wheels 9 is provided within the housing 4. Each of the polishing wheels 9 has a diameter different from that of the remaining polishing wheels 9. When one polishing wheel 9 is leaned against the inner side of the polishing surface, the remaining polishing wheels 9 are separate from the polishing surface. For complex work pieces, in the same work piece, the curvatures of surfaces at different parts are different from each other, and corresponding polishing wheels 9 could be used on the basis of the curvatures of the surfaces of the work piece to be polished. The abrasive belt 7 is pressed by the polishing wheels 9 and the polishing surface of the abrasive belt 7 forms a curved surface having a curvature similar to that of the surface of the work piece to be polished, for which the belt could be conveniently and rapidly polished. A transform mechanism is further disposed within the housing 4 to drive the polishing wheels to be pressed against the inner side of the polishing surface.

Figure 15:
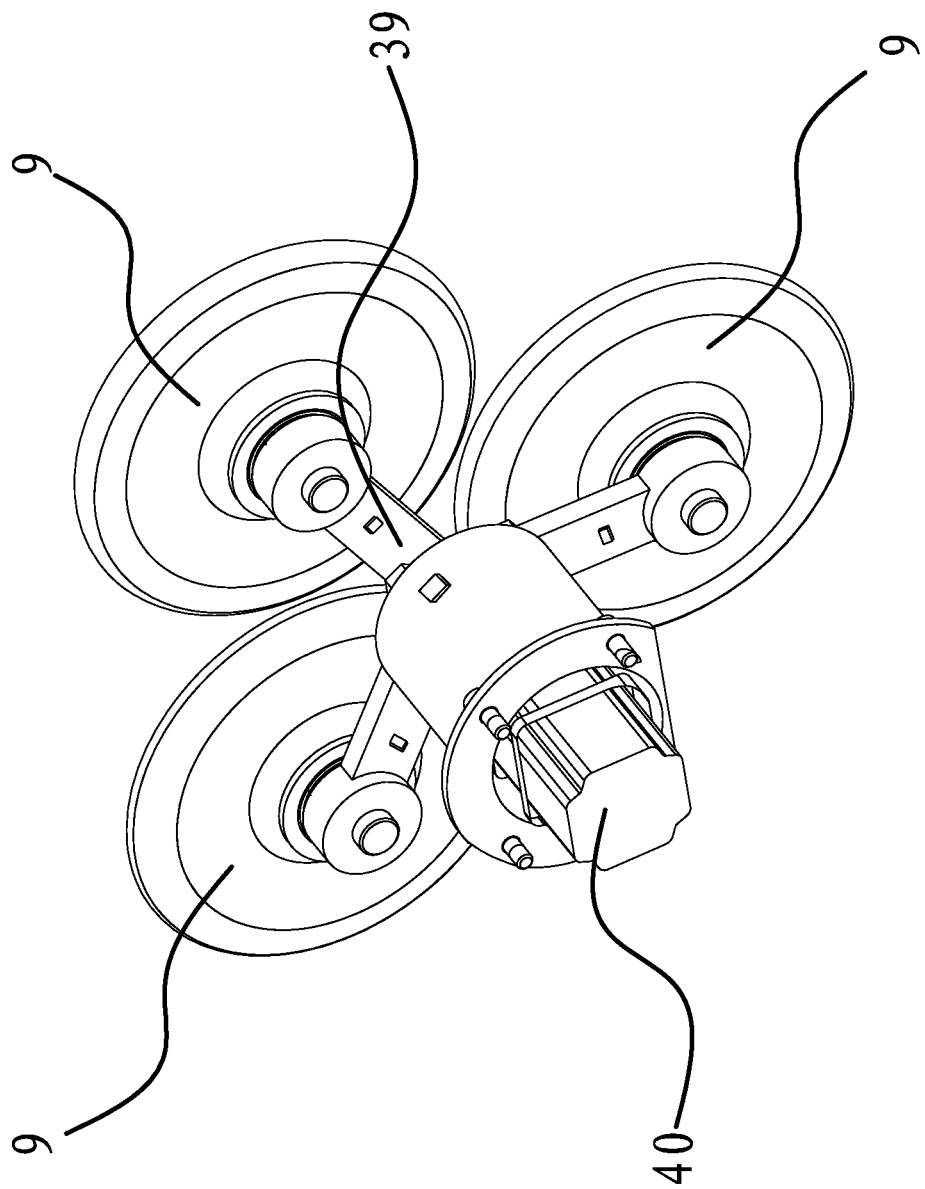
FIG. 15 is a diagram of the transform mechanism of the polish wheel in the polisher.

In FIG. 15, the transform mechanism includes a transform motor 40 and a connection support 39. The central part of the connection support 39 is fixedly connected with the output shaft of the transform motor 40. Three self-rotating polishing wheels 9 are placed around the connection support 39. The curved surface of the edge of each polishing wheel 9 has a curvature different from others. Each polishing wheel 9 is distributed on the same circle centered on the output shaft of the transform motor 40. The connection support 39 could be turned to at least press one of the polishing wheels 9 against the back of the abrasive belt 7 in the polisher and position the same.

The transform mechanism further includes a controller, a proximity switch connected with the controller and induction blocks in the number identical to that of the polishing wheels 9. The proximity switch is placed on the outer side of the transform motor 40 and the induction blocks are fixedly connected with the polishing wheels 9 respectively. When the induction blocks rotate with the polishing wheels 9 to the back of the abrasive belt 7 at a position opposite to the proximity switch, the proximity switch will receive the signal from the induction blocks and send the same to the controller. The controller will control the transform motor 40 to stop working and position according to the signal.

When the transform mechanism is in use, it is mounted on the inner side of the abrasive belt 7 and the abrasive belt 7 rotate, for which only surfaces of ordinary work pieces could be polished. As for special curved surfaces of the work piece to be polished, the operator could select corresponding polishing wheels 9 according to the curvature of the surface to be polished of the work piece to be processed. The connection support 39 and the polishing wheels 9 around the connection support 39 are driven by the transform motor 40 to rotate about the output shaft of the transform motor 39 toward the abrasive belt 7. The outer side of the polishing wheel 9 leaned against the abrasive belt 7 is beyond the original position of the abrasive belt 7, and the abrasive belt 7 is pressed against the outer side of the polishing wheel 9. Meanwhile, a shape identical to the polishing curved surface on the outer side of the polishing wheel 9 is formed on the front surface of the abrasive belt 7. As such, the surface of the work piece could be polished by rotating the abrasive belt 7.

Each polishing wheel 9 has a radian at the edge different from others in the same polishing unit A. The sizes of the abrasive particles of the abrasive belt 7 on adjacent polishers 3 are decreased in turn in the same polishing unit A. As the size of the abrasive particles of the abrasive belt 7 in each polisher 3 is different from that in other polishers 3, the polishing precision of the surface of the work piece is gradually increased by polishing the work piece in a series of polishers 3 in which the size of the abrasive particles are decreased. Obviously, it could be set by the programmer when programming that the work piece could be held by the manipulator 2 to be polished in a series of polishers 3 in the order of the size of the abrasive particles in the same polishing unit A. The manipulator 2 also operates in the polishing unit A for polishing according to the set order.

When the work piece is processed by using the automatic processing system, a fourth shaft is provided on the processing center 1. The work piece could be held for one time and rotate by 360 degrees by using the fourth shaft. The work piece is firstly machined by the processing center 1 and the machined work piece is then held by the chuck on the clamping arm 12. Thereafter, the clamping arm 12 is driven by the clamping frame 11 to rotate to the polisher 3 in the same polishing unit A for polishing. As four polishers 3 are provided in the same polishing unit A and the sizes of the abrasive particles of the abrasive belt 7 of the polishers 3 are gradually decreased, the work piece will move to the next polisher 3 to accomplish the whole polishing process after its surface has been fully polished in the first polisher 3. When the surface of the work piece is subject to a complete polishing process by each polisher 3, the polishing precision of the surface of the work piece is gradually enhanced. The polished work piece will be located in the storage hopper by using the clamping arm 12.

As the machining speed of the work piece by the processing center 1 is higher than the polishing speed of the work piece by the polishers 3, three polishing units A are provided for the processing center in this processing system. To this end, the work pieces already machined by the processing center 1 could be immediately polished and the production efficiency is guaranteed. Moreover, the work piece is kept stationary when being processed by the processing unit 1, and only one electronic control system is required to control the manipulator 2. Preset program could be input into the electronic control system to ensure the clamping arm 12 holds the work piece in the same way every time. As a result, the molded work pieces will have the same shape. In other words, the processing precision of the work pieces is higher and the integrity thereof is better.

Second Embodiment

Figure 1:
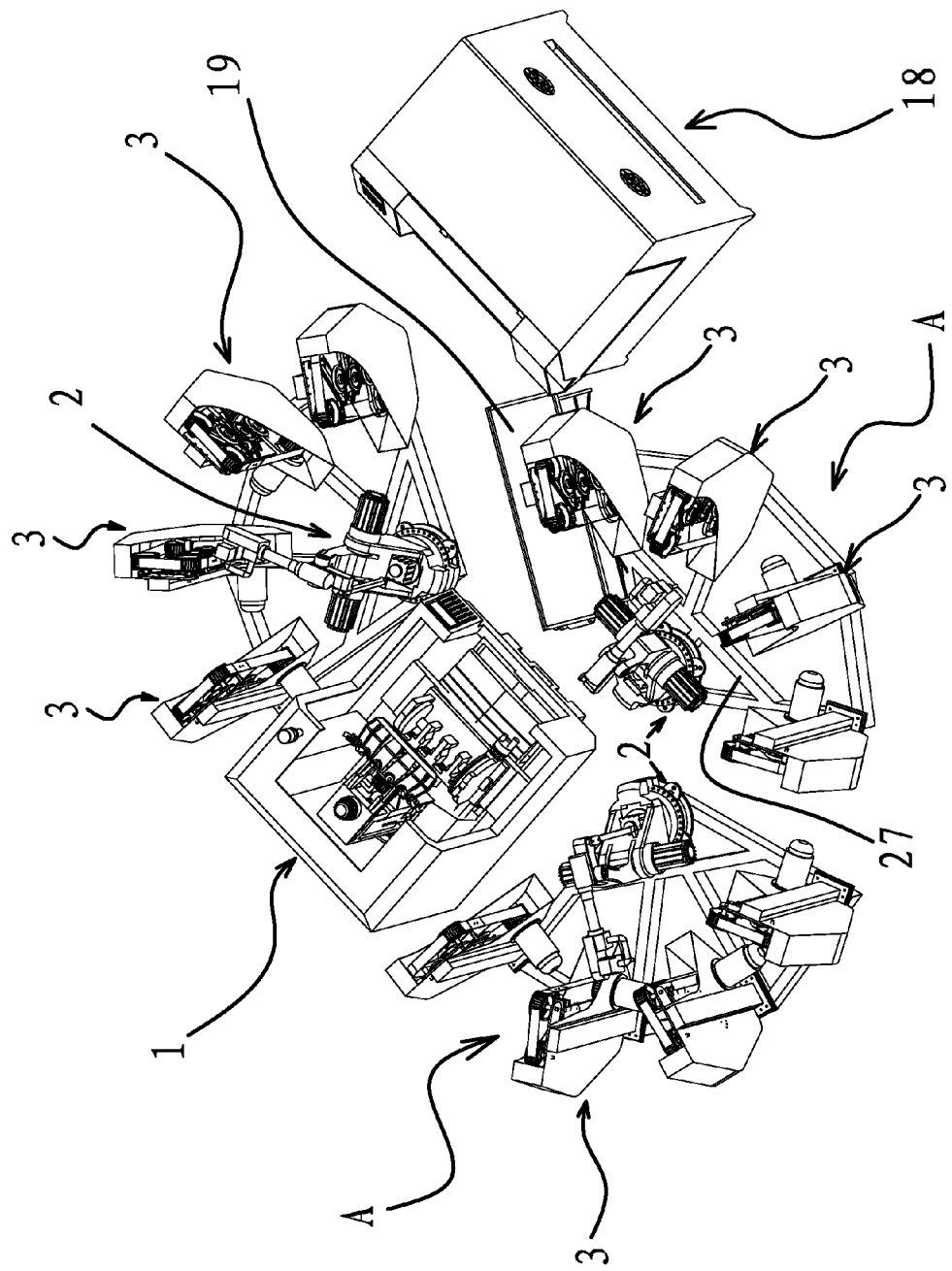
FIG. 1 is a structural diagram of the surface processing unit for a work piece according to the second embodiment of the invention.

As shown in FIG. 1, a surface processing system for a work piece is disposed on the side of the processing center 1 for machining the work piece. The system includes polishing units A, a finishing means 18 and a conveyer belt 19 provided between the polishing unit and the finishing means 18, which could drive the work piece to move horizontally. In particular, there are three polishing units A evenly distributed around the processing unit 1. A manipulator 2 and four polishers 3 having different polishing precisions are provided on each polishing unit A. A mounting support 27 is disposed in each polishing unit A, and the manipulator 2 and each polisher 3 are mounted on the mounting support 27. The mounting support 27 is in the shape of a sector. The manipulator 2 is fixed at the center of the sector of the mounting support 27. All the polishers 3 are evenly distributed on the arc edge of the sector of the mounting support 27. The work piece could be moved by the manipulator 2 between the processing center 1 and the polishing unit A. When the manipulator 2 is located at the processing unit 1, the manipulator 2 loads the machined work piece for one time. When the manipulator 2 is located at the polishing unit A, the manipulator 2 keeps holding the work piece and transfers the work piece to each polisher 3 corresponding to the polishing unit A where the manipulator 2 is positioned in a set order, for polishing.

After the work piece held by the manipulator 2 is polished in the polishing unit A, the manipulator 2 puts the polished work piece on the conveyer belt 19. The conveyer belt 19 transfers the work piece to a position close to the finishing means 18. The operator places the polished work piece on the conveyer belt 19 in the finishing means 18 for finishing.

Figure 2:
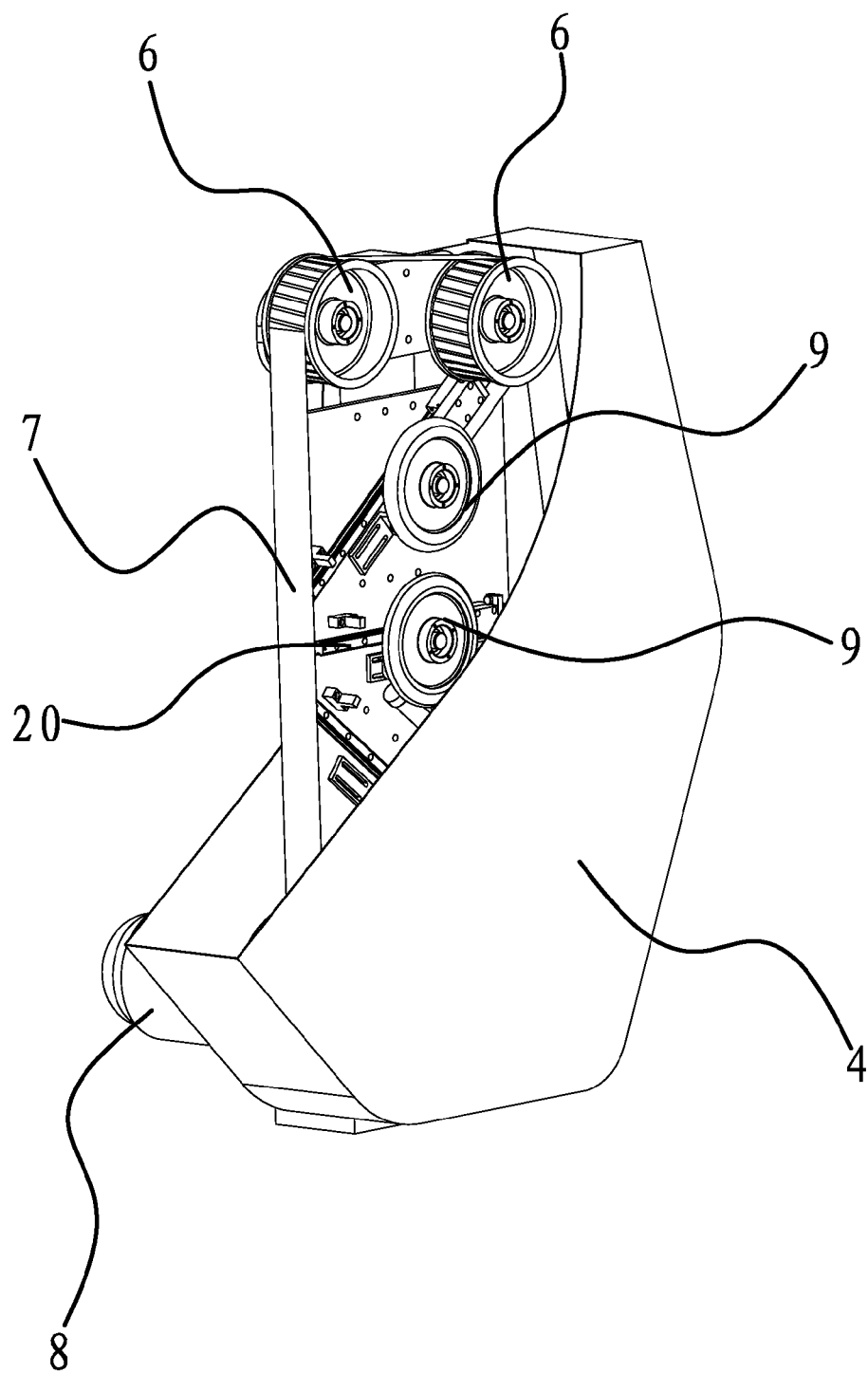
FIG. 2 is a structural diagram of the polisher in FIG. 1.
Figure 8:
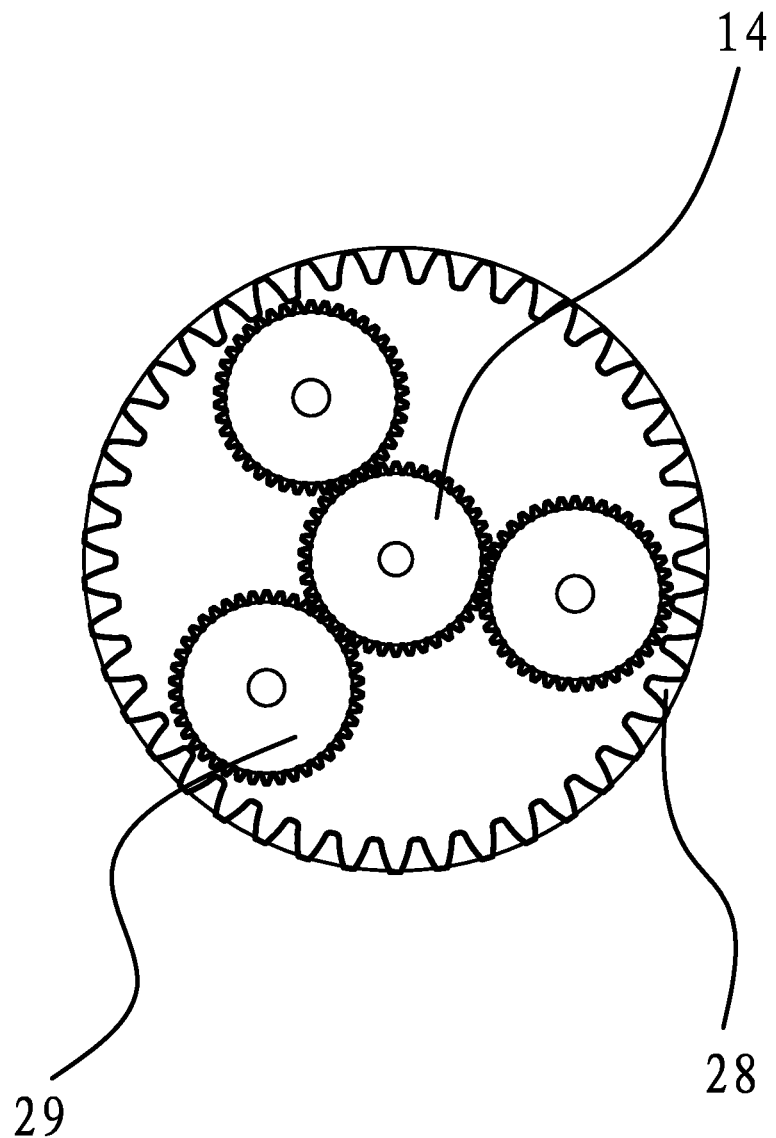
FIG. 8 is a top view at the first driving element according to the first embodiment.
Figure 9:
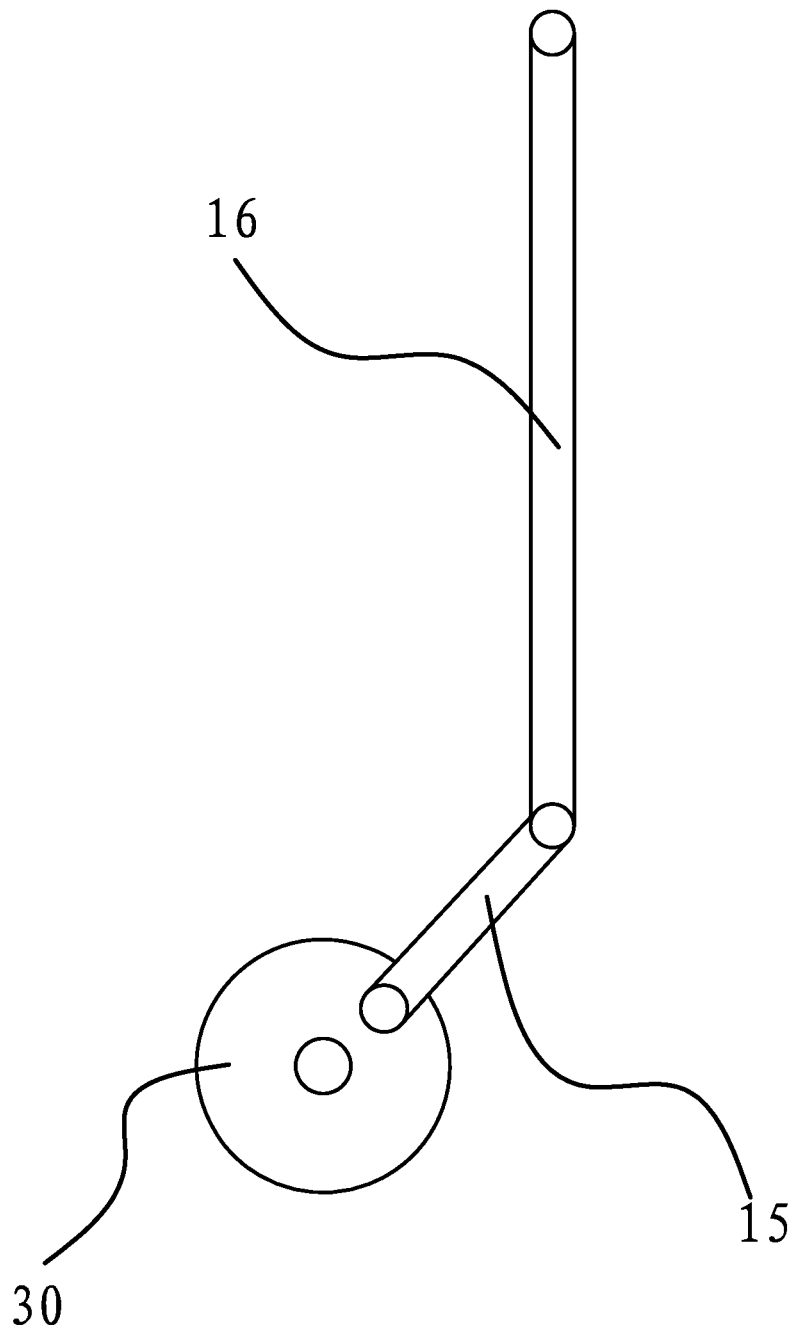
FIG. 9 is a simplified diagram at the second driving element according to the first embodiment.

The manipulator is similar to that of the first embodiment except in the first and second driving elements. As shown in FIGS. 8 and 9, the first driving element comprises a rotary motor 13 fixedly connected to the base 10. An annular gear 28 is fixedly connected to the inner side of the clamping frame 11. Several intermediate gears 29 are connected with the base 10. A first transmission gear 14 is fixedly connected with the rotation shaft of the rotary motor 13. The intermediate gears 29 are engaged with the first transmission gear 14 and the annular gear 28 in the meantime. When the rotation shaft of the rotary motor 13 is in rotation, the first transmission gear 14 fixedly connected to the rotation shaft of the rotary motor 13 will rotate therewith. The power will be transformed into the rotation of the annular gear 28 by means of the transmission of the intermediate gears 29 eventually. As the annular gear 28 is fixedly connected to the inner side of the clamping frame 11, the inner side of the clamping frame 11 could rotate relative to the base 10. By using the aforesaid planet gear structure, the rotary motor 13 fixed on the clamping frame 11 could bring the clamping frame 11 into rotation relative to the base 10. Such a configuration is used in the manipulator 2 for transmission, for which the stability of the manipulator 2 is guaranteed Referring to FIG. 9, the second driving element includes a swing motor 17 fixedly connected to the middle of the clamping frame 11. A transmission disk 30 is fixedly connected with the rotation shaft of the swing motor 17. One end of the first connection rod 15 is hinged to the edge of the transmission disk 30 and the other end thereof is hinged to one end of the second connection rod 16. The other end of the second connection rod 16 is hinged to the back end of the clamping arm 12. The transmission disk 30 is fixedly connected with the rotation shaft of the swing motor 17. When the rotation shaft of the swing motor 17 is in rotation, the transmission disk 30 will rotate therewith. As one end of the first connection rod 15 is hinged to the edge of the transmission disk 30 and the other end thereof is hinged to one end of the second connection rod 16, the back end of the clamping arm 12 will swing up and down when the transmission disk 30 rotates. As shown in FIGS. 1 and 2, the polishers 3 are circumferentially distributed in an arc shape about the clamping frame 11 of the manipulator 2. The distance from each polisher 3 to the clamping frame 11 is the same as each other. As such, when the work piece is held by the manipulator 2 from one polisher 3 to the next polisher 3 within the same polishing unit A, the moving distance is the same as each other. In other words, the moving distance of the clamping frame 11 of the manipulator 2 is the same in one polishing unit A. Such a configuration facilitates the numeric control programming by the operator, shortens the moving path, and improves the moving efficiency. The polisher 3 is an abrasive belt polisher comprising a housing 4, and a driving wheel 5, a driven wheel 6 and an abrasive belt 7 within the housing 4. The sizes of the abrasive particles of the abrasive belt 7 on adjacent polishers 3 are decreased in turn in the same polishing unit A. The driving wheel 5 is connected with a polishing motor 8. A portion of the driving wheel 5 and the driven wheel 6 extends out of the housing 4. The abrasive belt 7 is covered on the driving wheel 5 and driven wheel 6 and a polishing surface is formed on the outer side of the abrasive belt 7 out of the housing 4 for polishing the work piece.

Figure 3:
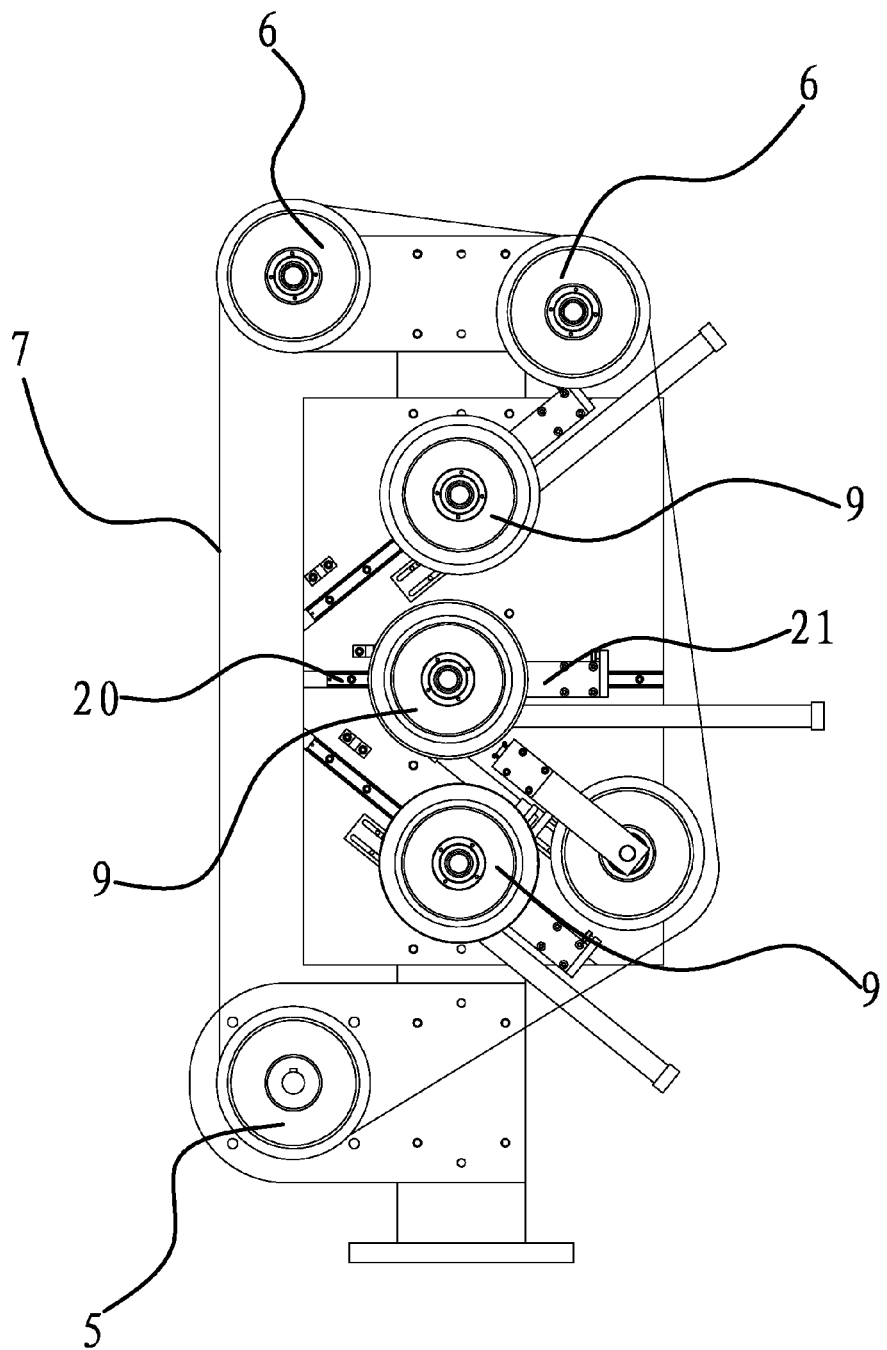
FIG. 3 is a side view of the polisher of FIG. 2 without the housing.
Figure 4:
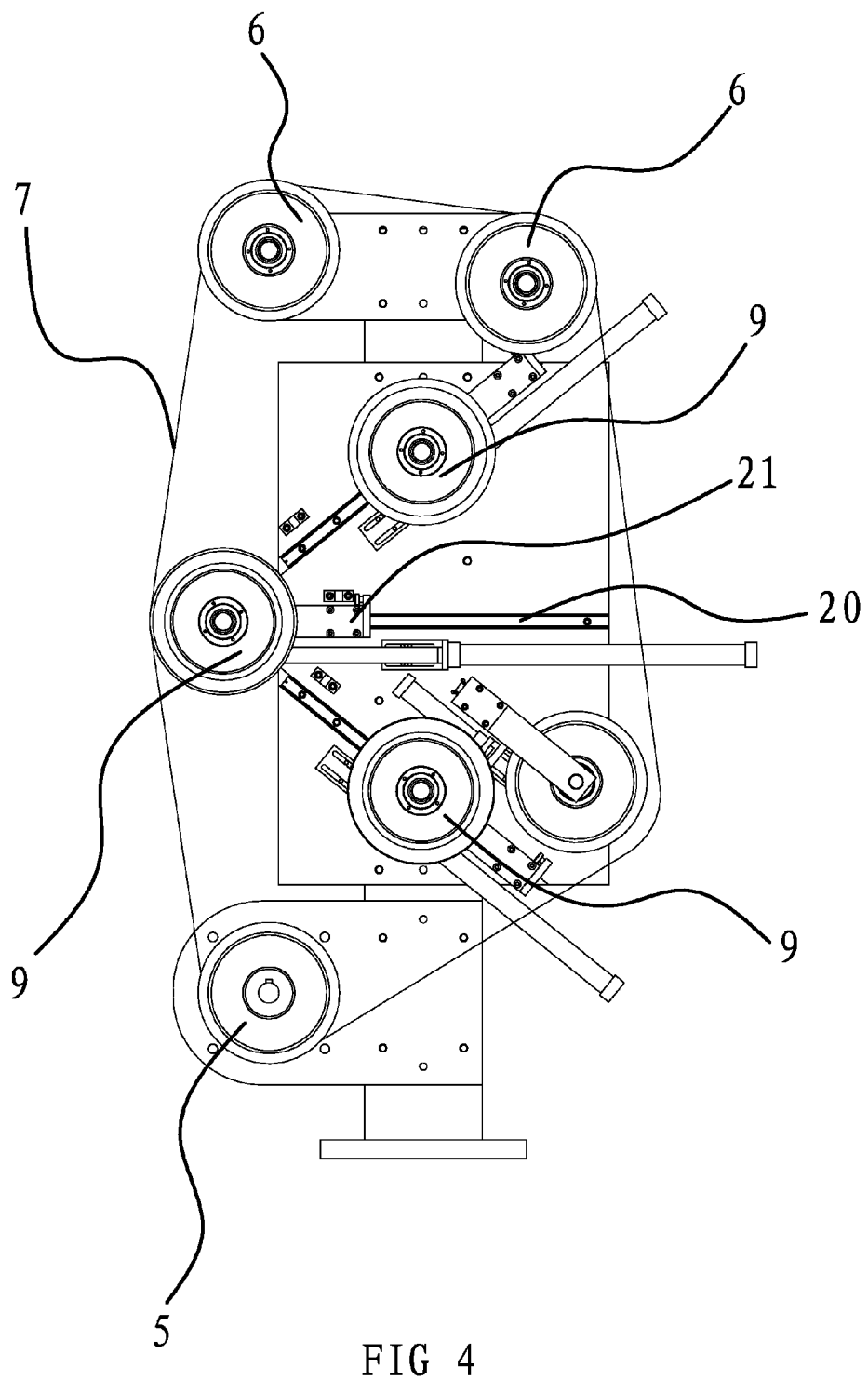
FIG. 4 is a side view of the polishing wheel of FIG. 2 pressed against the inner side of the abrasive belt.
Figure 5:
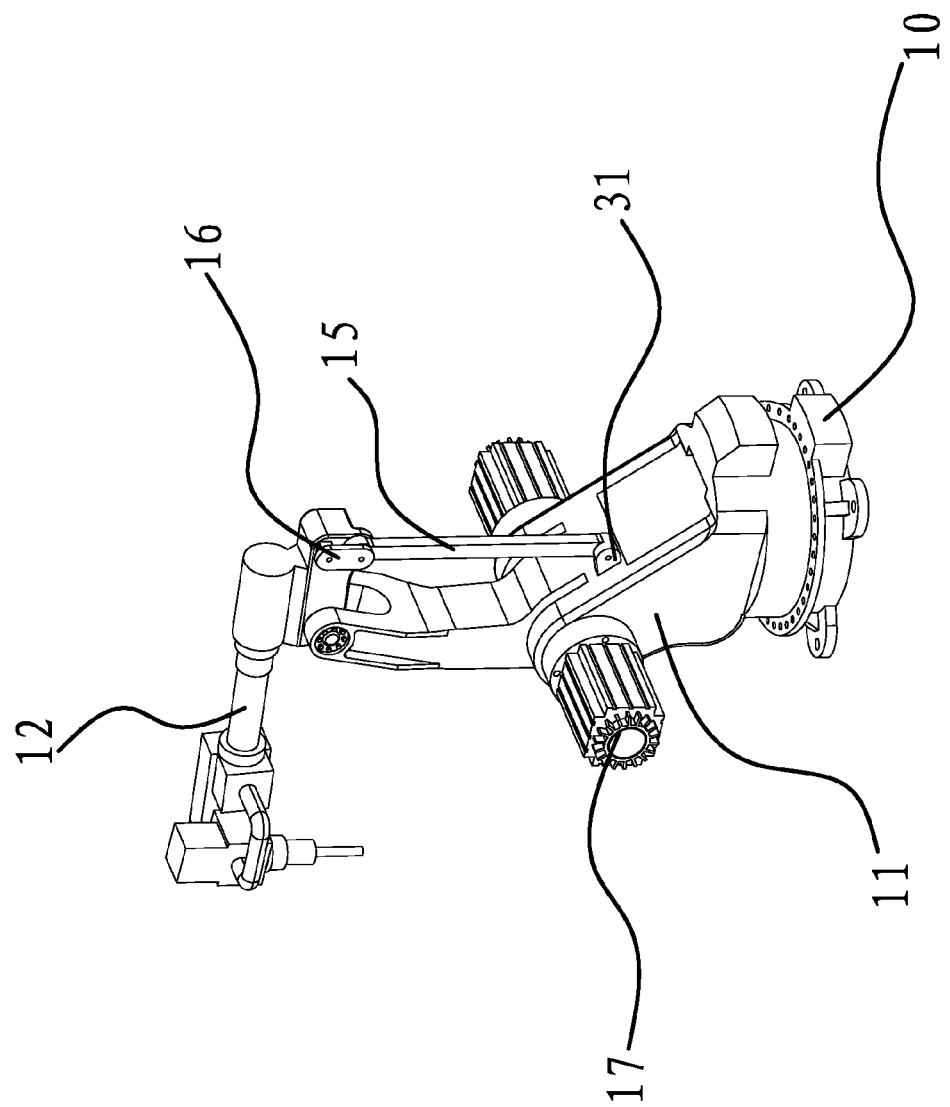
FIG. 5 is a structural diagram of the manipulator of the surface processing system for the work piece.

With reference to FIGS. 3 and 4, polishing wheels 9 are pressed against the inner side of the polishing surface of the abrasive belt in the housing 4. In this embodiment, there are three polishing wheels 9. In the same polisher 3, the curved surface at the edge of each of the polishing wheels 9 has a curvature different from that of others, and the diameter of each polishing wheel 9 is different from that of the others. A transform mechanism is located at each polishing wheel 9 within the housing 4 for driving the polishing wheel 9. Each transform mechanism comprises adjustment guides 20 corresponding to respective polishing wheels 9 disposed within the housing 4 and sliders 21 which are disposed on and could move along the adjustment guides 20. Each polishing wheel 9 is connected with its corresponding slider 21. The transform mechanism further includes a polishing wheel driving element connected with the slider 21 within the housing 4. The polishing wheel driving element is a polishing air cylinder or oil cylinder. The piston rod of the polishing air cylinder is fixedly connected with the slider 21. The polishing wheel 9 on the slider 21 corresponding to a polishing air cylinder could be pressed against the inner side of the abrasive belt 7 driven by the piston rod of the polishing air cylinder. When the curved surface of the work piece has to be polished, the slider 21 is driven by the polishing wheel driving element to move forward along the adjustment guide 20 and to press the polishing wheel 9 on the slider 21 against the inner side of the abrasive 7.

Adjustment guides 20 are provided within the housing 4 corresponding to the said three polishing wheels 9 respectively. The same acute angle is formed between every two adjacent adjustment guides 20. Each polishing wheel 9 could be pressed against the same position of the abrasive belt 7.

Figure 6:
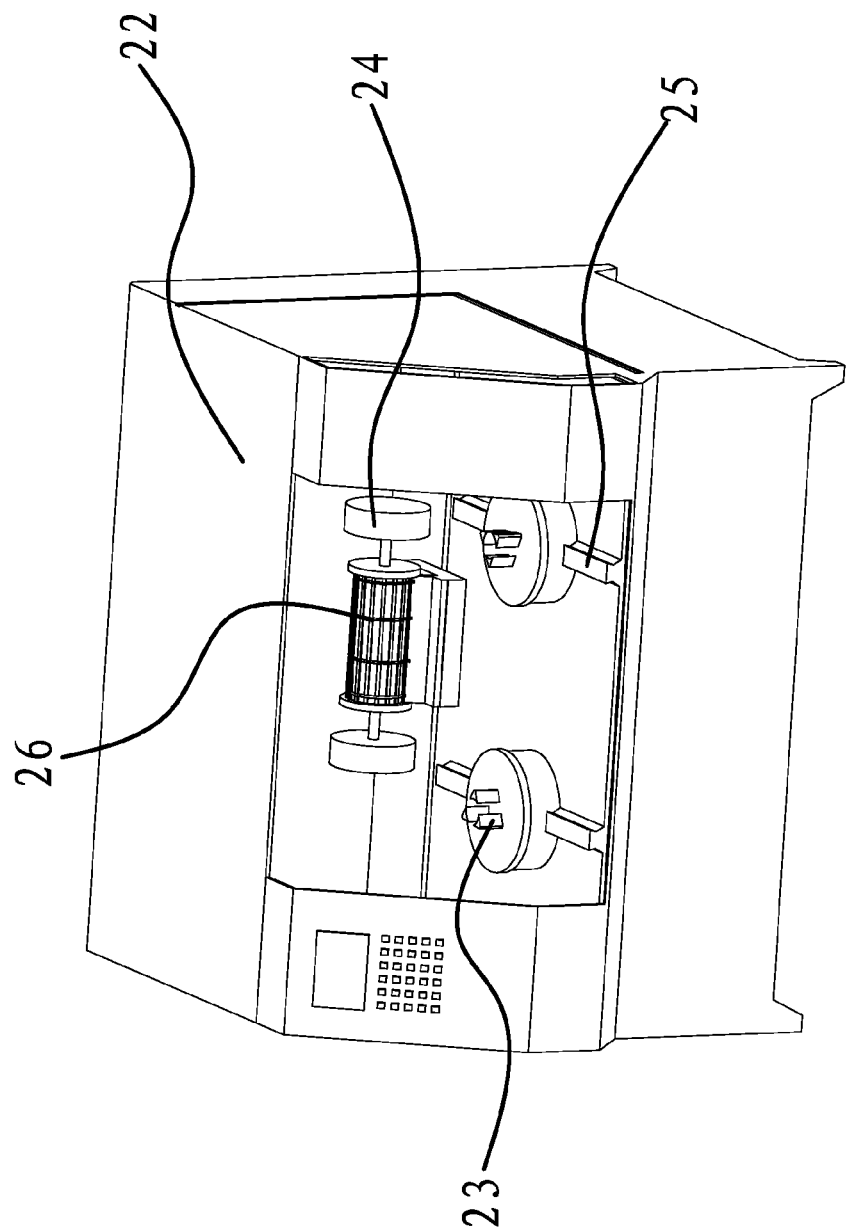
FIG. 6 is a structural diagram of the finishing means of the surface processing system for the work piece.
Figure 7:
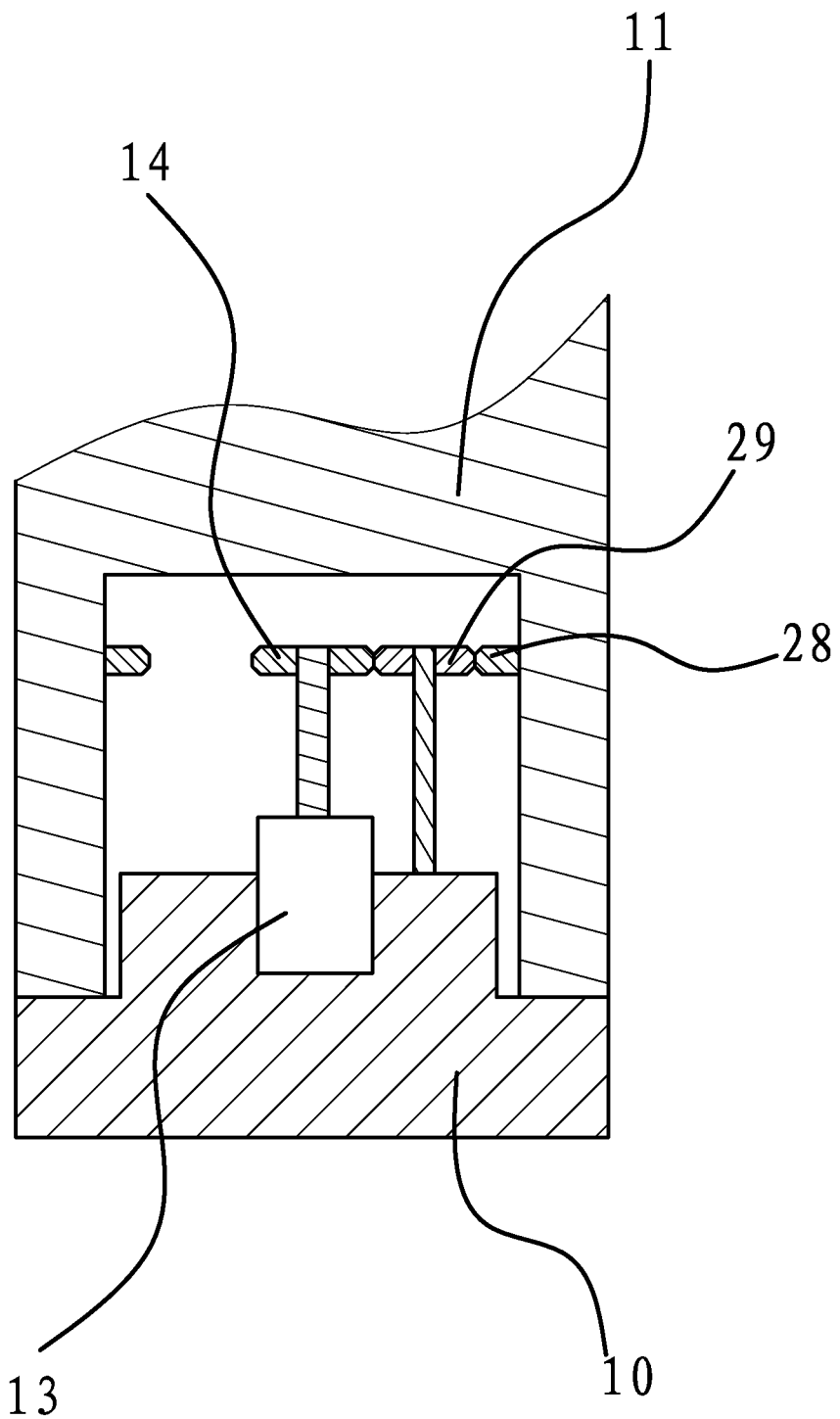
FIG. 7 is a section view at the first driving element according to the first embodiment.

As shown in FIG. 6, the finishing means 18 is located on the side of the polishing unit. The finishing means 18 includes a finishing frame 22, a clamp 23 and a finishing wheel 24. A finishing guide 25 is disposed horizontally on the finishing frame 22. The clamp 23 is located on the finishing guide 25 and the clamp 23 is connected with the finishing driving element which could drive it to move. The finishing driving element could be an air cylinder or oil cylinder, and is connected with the clamp 23 via the piston rod of the air or oil cylinder. The finishing wheel 24 is connected with the rotation shaft of the finishing motor 26 and is located at the upper part of the finishing frame 22. In this embodiment, there are two finishing guides 25 which are horizontally disposed. A clamp 23 is provided on each of the finishing guides 25. There are two finishing wheels 24 respectively corresponding to these two finishing guides 25. Two finishing wheels 24 are connected with the same finishing motor 26. The finishing wheels 24 are located above the finishing guides 25. Both ends of the rotation shaft of the finishing motor 26 extend out of the casing of the finishing motor 26 respectively. Two finishing wheels 24 are connected to both ends of the rotation shaft of the finishing motor 26 respectively.

In actual processing, a four-axis linkage manipulator is disposed at the processing center 1, which is used to automatically hold the unprocessed work piece and automatically load the work piece at the processing center. After the work piece is machined and molded at the processing center 1, the clamping frame 11 of the manipulator within each polishing unit A will rotate under control of program preset by the operator. The clamping arm 12 of the manipulator 2 thereby rotate with the clamping frame 11 to the processing center 1 and the molded work piece is held by the chuck at the front end of the clamping arm 12. The clamping arm 12 will then rotate to the polisher 3 within the same polishing unit A as the manipulator 2 to polish the surface of the work piece. The surface processing system of the work piece is controlled by a complete set of programs edited by the operator. Each processing procedure is strictly controlled by the program.

As four polishers 3 are provided within the same polishing unit A and the sizes of abrasive particles of the polishers 3 are decreased in turn, after the work piece is held by the clamping arm 12 of the manipulator 2 on the first polisher 3 and subject to all the polishing processes required by the surface thereof, the work piece moves to the next polisher 3 for the same polishing process in which the polishing precision for the surface of the work piece is higher than that in the previous polisher 3. Such a process continues until the work piece is polished by the last polisher 3 in the polishing unit A, for which the surface of the work piece has been polished by four polishers 3 and the highest polishing precision is obtained. As all the polishers 3 in the same polishing unit A are distributed in an arc shape about the clamping frame 11, every time the clamping arm 12 is brought by the clamping frame 11 to move from one polisher 3 to the next polisher 3, the moving distance thereof is the same, which significantly simplifies the programming work of the operator and ensures the synchronism of the manipulator 2 in operation.

Moreover, for work pieces having complex curved surfaces, when the surface is to be polished, the polishing wheel 9 having the same curvature as the curved surface of the work piece will be selected by a program, the slider 21 is pushed outward by the piston rod of the polishing air cylinder corresponding to the polishing wheel 9 to drive the polishing wheel 9 to move forward and press the same against the inner side of the abrasive belt 7, for which a shape is formed on the outer side of the abrasive belt 7 identical to that of the edge of the polishing wheel 9. To this end, a desired curved surface could be polished on the work piece by contacting the work piece with the shape of the outer side of the abrasive belt 7. Of course, when many curved surfaces exist at the work piece and have different curvatures, additional polishing wheels 9 could be selected to repeat the aforesaid process until the surface of the work piece is completely polished.

After the polishing process is completed, the polished work piece is placed by the manipulator 2 on the conveyer belt 19 to be transferred to a position close to the finishing means 18. The operator stands next to the finishing means 18 and puts the work piece on the conveyer belt 19 into the clamp 23 of the finishing means 18. The clamp 23 moves along to the finishing guide 25 to the finishing wheel 24 driven by the finishing driving element. The rotation shaft of the finishing motor 26 drives the finishing wheel 24 to rotate. The surface of the work piece is polished when the work piece is in contact with the finishing wheel 24.

As the machining speed of the work piece by the processing center 1 is higher than the polishing speed of the work piece by the polishing unit A, three polishing units A are provided for surface processing system for the work piece. To this end, the work pieces already machined by the processing center 1 could be polished in time, for which the production efficiency of the work piece and the utilization rate of the processing center 1 are guaranteed. Moreover, the work piece is kept stationary when being processed by the processing unit 1. It could be ensured that the clamping arm 12 of the manipulator holds the work piece in the same way every time by programming. As a result, the molded work pieces will have the same shape. In other words, the processing precision of the work pieces is higher and the integrity thereof is better.

The embodiments described herein are merely illustrative of the spirit of the invention. It is obvious for those skilled in the art to make various modifications, supplements or alternatives to these embodiments without departing from the spirit of the invention or the scope as defined by the appended claims.

LIST OF REFERENCE NUMERALS

1 Processing Center
2 Manipulator
A Polishing Unit
3 Polisher
4 Housing
5 Driving Wheel
6 Driven Wheel
7 Abrasive Belt
8 Polishing Motor
9 Polishing Wheel
10 Base
11 Clamping Frame
12 Clamping Arm
13 Rotary Motor
14 First Transmission Gear
15 First Connection Rod
16 Second Connection Rod
17 Swing Motor
18 Finishing Means
19 Conveyer Belt
20 Adjustment Guide
21 Slider
22 Finishing Frame
23 Clamp
24 Finishing Wheel
25 Finishing Guide
26 Finishing Motor
27 Mounting Support
28 Annular Gear
29 Intermediate Gear
30 Transmission Disk
31 Swing Arm
32 Elastic Sheet
33 Connection Cover
34 Ejector Pin
35 Indentation
36 Annular Shoulder
37 Positioning Air Cylinder
38 Positioning Convex Head
39 Connection Support
40 Transform Motor

What is claimed is:

1. A surface processing system for a work piece disposed on the side of the processing center (1) which is capable of being used to machine the work piece, characterized in that, the system comprises at least one group of polishing units (A), a manipulator (2) and several polishers (3) with different polishing precisions are provided on the polishing units (A), the polishers (3) are arranged around the manipulator (2) in turn, the work piece is capable of being moved by the manipulator (2) between the processing center (1) and the polishing units (A), the machined work piece is loaded by the manipulator (2) for one time when the manipulator (2) is located at the processing center (1), and when the manipulator (2) is located at the polishing units (2), the manipulator (2) keeps holding the work piece and transfers the work piece in a preset sequence to each polisher (3) corresponding to the polishing unit (A) where the manipulator (2) is located;

wherein the polisher (3) is an abrasive belt polisher (3), comprising a housing (4) and a driving wheel (5), a driven wheel (6) and an abrasive belt (7) located within the housing (4), the driving wheel (5) is driven by a polishing motor (8) into rotation, the housing (4) is covered outside of the driving wheel (5) and driven wheel (6) and a portion of the driving wheel (5) and a portion of the driven wheel (6) extend out of the housing (4), the abrasive belt (7) is covered on the driving wheel (5) and driven wheel (6) and the outer side of the abrasive belt (7) exposed out of the housing (4) is a polishing surface used for polishing the work piece.

2. The surface processing unit as claimed in claim 1, characterized in that, the sizes of the abrasive particles of the abrasive belt (7) of the adjacent polishers (3) within the same polishing unit (A) are gradually decreased.

3. The surface processing unit as claimed in claim 2, characterized in that, a group of polishing wheels (9) is provided within the housing (4), each of the polishing wheels (9) has a diameter different from that of the remaining polishing wheels (9), a transform mechanism is provided adjacent to the polishing wheels (9) within the housing (4) which could respectively drive the polishing wheels (9) to press against the same position on the inner side of the polishing surface of the abrasive belt (7), and when one polishing wheel (9) is pressed against the inner side of the polishing surface, the other polishing wheels (9) are separate from the polishing surface.

4. The surface processing unit as claimed in claim 3, characterized in that, the transform mechanism includes a transform motor (4) and a connection support (39), the central part of the connection support (39) is fixedly connected with the output shaft of the transform motor (40), several self-rotable polishing wheels (9) with different curvatures are placed around the connection support (39), each polishing wheel (9) is distributed on the same circle centered on the output shaft of the transform motor (40), and the connection support (9) is capable of being turned to at least press one of the polishing wheels (9) against the inner side of the polishing surface and position the same.

5. The surface processing unit as claimed in claim 4, characterized in that, the transform mechanism further includes a controller, a proximity switch connected with the controller and induction blocks in the number identical to that of the polishing wheels (9), the proximity switch is placed on the outer side of the transform motor (40) and the induction blocks are fixedly connected with the polishing wheels (9) respectively, when the induction blocks rotate with the polishing wheels (9) to the inner side of the polishing surface at a position opposite to the proximity switch, the proximity switch will receive the signal from the induction blocks and send the same to the controller, and the controller will control the transform motor (40) to stop working and position according to the signal.

6. The surface processing unit as claimed in claim 3, characterized in that, the transform mechanism comprises adjustment guides (20) disposed within the housing (4) and sliders (21) which are disposed on and could move along the adjustment guides (20), the polishing wheels (9) are connected with the sliders (21), the transform mechanism further includes a polishing wheel driving element within the housing (4), the polishing wheel driving element is connected with the sliders

(21) and the polishing wheels (9) are driven by the polishing wheel driving element to press against the inner side of the abrasive belt (7).

7. The surface processing unit as claimed in claim 2, characterized in that, the system further includes a finishing means (18) on the side of the polishing unit (A), and there is at least one finishing means (18) which finishes the polished work piece.

8. The surface processing unit as claimed in claim 7, characterized in that, a conveyer belt (19) which could move horizontally is provided between the polishing unit (A) and the finishing means (18).

9. The surface processing unit as claimed in claim 8, characterized in that, the finishing means (18) includes a finishing frame (22), a clamp (23) and a finishing wheel (24), a finishing guide (25) is disposed horizontally on the finishing frame (22), the clamp (23) is located on the finishing guide (25) and the clamp (23) is connected with the finishing driving element which could drive it to move, and the finishing wheel (24) is connected with the rotation shaft of the finishing motor (26) and is located above the finishing guide (25).

10. The surface processing unit as claimed in claim 9, characterized in that, there are two finishing guides (25) which are horizontally disposed, a clamp (23) is provided on each of the finishing guides (25), there are two finishing wheels (24) respectively corresponding to these two finishing guides (25), and the said two finishing wheels (24) are connected with the same finishing motor (26).

11. The surface processing unit as claimed in claim 1, characterized in that, the manipulator (1) includes a base (10), a clamping frame (11) and a clamping arm (12), the lower end of the clamping frame (11) is fixedly connected in the axial direction and rotationally connected in the circumferential direction with the base (10), a first driving element is provided on the clamping frame (11) for driving the clamping frame (11) to rotate with respect to the base (10) and to be positioned, the upper end of the clamping frame (11) is hinged to the clamping arm (12), a chuck is set at the front end of the clamping arm (12) to hold the work piece, and a second driving element is provided between the rear end of the clamping arm (12) and the clamping frame (11) to drive the clamping arm (12) to swing around the hinge point of the clamping frame (11) with the clamping arm (12) and to be positioned.

12. The surface processing unit as claimed in claim 11, characterized in that, the chuck includes a cylindrical connection cover (33) and a columnar ejector pin (34) provided within the connection cover (33), the ejector pin (34) is circumferentially fixed and axially slidable relative to the connection cover (33), several indentations (35) are axially provided on the front end of the connection cover (33) to form several elastic sheets (32) at the front end of the connection cover (33), an annular shoulder (36) is formed on the end of the elastic sheets (32) to lock up the work piece, the inner end of the ejector pin (34) is connected with the piston rod of the air cylinder mounted with the clamping arm (12), when the ejector pin (34) extends forward, the front end of the connection cover (33) will be extruded to open the elastic sheets (32) at the front end of the connection cover (33) outwards, and several positioning convex heads (38) are formed on the frond end of the ejector pin (34) for preventing the work piece from rotating relative to the ejector pin (34) when the ejector pin (34) is inserted into the inner hole of the work piece.

13. The surface processing unit as claimed in claim 12, characterized in that, the first driving element comprises a rotary motor (13) fixedly connected to the clamping frame (11), a non-rotary fixed gear is fixed on the base (10), the clamping frame (11) is connected with a first transmission gear (14) and a third transmission gear which is coaxial with and above the first transmission gear (14), a second transmission gear is fixedly connected with the rotation shaft of the rotary motor (13) and engaged with the third transmission gear, and the first transmission gear (14) is engaged with the aforesaid fixed gear.

14. The surface processing unit as claimed in claim 12, characterized in that, the second driving element includes a swing motor (17) fixedly connected to the middle of the clamping frame (11), one end of the first connection rod (15) is hinged to the swing arm (31) of the swing motor (17), the other end of the first connection rod (15) is hinged to one end of the second connection rod (16), and the other end of the connection rod (16) is hinged to the rear end of the clamping arm (12).

15. The surface processing unit as claimed in claim 11, characterized in that, the first driving element comprises a rotary motor (13) fixedly connected to the base (10), an annular gear (28) is fixedly connected to the inner side of the clamping frame (11), several intermediate gears (29) are connected with the base (10), a first transmission gear (14) is fixedly connected with the rotation shaft of the rotary motor (13), and the intermediate gears 29 are engaged with the first transmission gear (14) and the annular gear (28) in the meantime.

16. The surface processing unit as claimed in claim 15, characterized in that, the second driving element includes a swing motor (17) fixedly connected to the middle of the clamping frame (11), a first connection rod (15) and a second connection rod (16), a transmission disk (30) is fixedly connected with the rotation shaft of the swing motor (17), one end of the first connection rod (15) is hinged to the edge of the transmission disk (30), and the other end of the connection rod (15) is hinged to one end of the second connection rod (16), and the other end of the second connection rod (16) is hinged to the rear end of the clamping arm (12).

17. The surface processing unit as claimed in claim 16, characterized in that, the polishers (3) are distributed in an arc shape centered on the clamping frame (11) of the manipulator (2), and the distance from each polisher (3) to the clamping frame (11) is the same as each other.

* * * * *